United States Patent Office 3,837,984
Patented Sept. 24, 1974

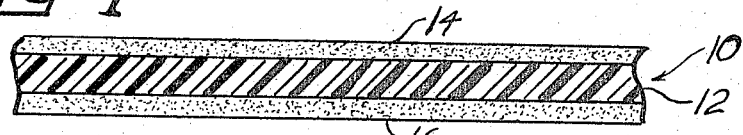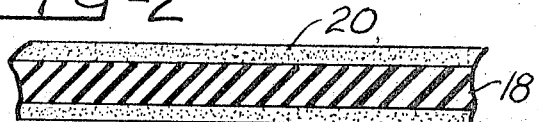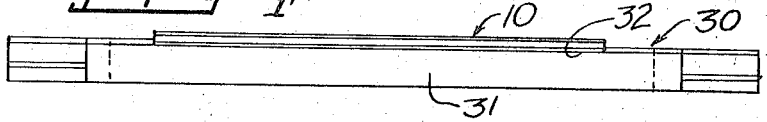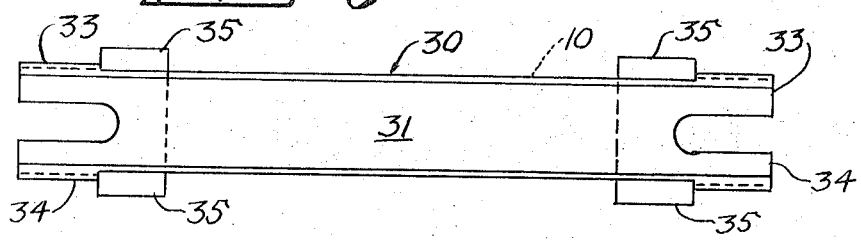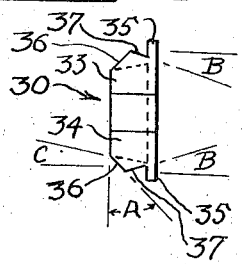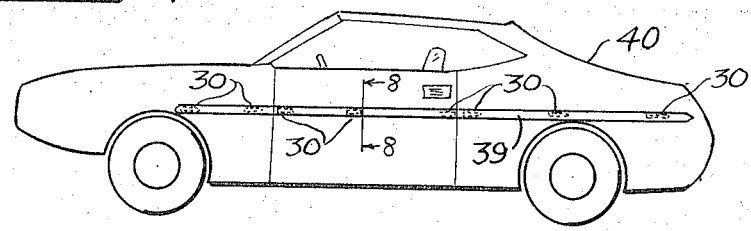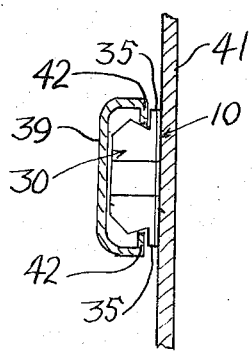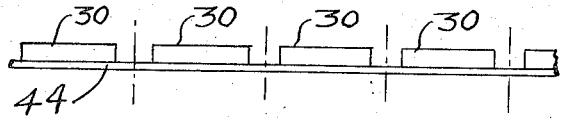

3,837,984
THERMOSETTING ADHESIVE AND ARTICLES USING THE SAME
David P. Wagner, Elmhurst, and James E. Gugle, Crystal Lake, Ill., assignors to Illinois Tool Works Inc., Chicago, Ill.
Filed Jan. 19, 1972, Ser. No. 219,046
Int. Cl. B32b 5/12
U.S. Cl. 161—53                                        7 Claims

ABSTRACT OF THE DISCLOSURE

Disclosed is a thermosetting adhesive which is formed of a nitrile phenolic and applied in slurry form onto a support layer of polyurethane and then dried. When heat is applied thereto the dried nitrile phenolic will soften to cause adhesion of the material to a surface to which it is applied. The nitrile phenolic is formed of a mixture of carboxy-modified NBR polymer, thermosetting phenolic resin, coumarone-indene resin, and sterically hindered phenol of the type octadecyl 3-(3',5'-di-tert-butyl-4'-hydroxyphenyl) propionate. The nitrile phenolic and polyurethane support then form a thermosetting tape which can be secured to a clip or other fastener. The clips or fasteners utilizing the thermosetting adhesive can be firmly secured to the exterior painted surface of automobiles by the application of heat for a short period of time. Also the thermosetting adhesive tape can be applied to threaded fasteners for securing the same to wall surfaces such as metal or fiberglass for securing other articles thereto.

BACKGROUND OF THE INVENTION

This invention relates generally to a thermosetting adhesive mixture and to articles using the same for mounting such articles to surfaces and to a method of forming a thermosetting adhesive surface on such articles.

Thermosetting adhesives are relatively well-known for providing means to join materials by an adhesive which is durable, waterproof, and weatherproof and which produces bonds that are sufficiently strong to be of great reliability when used in areas which usually required rivets or screws. However, thermosetting adhesives heretofore utilized had the disadvantage of being relatively slow acting. That is, the application of heat had to be effected for thirty minutes to an hour before a proper adhesive bond was created. This slow acting thermosetting characteristic is of no disadvantage when applying articles to a flat horizontal surface when the article being fastened can sit in a fixed position by weight of gravity. On the other hand, when applying articles to vertical surfaces it is desirable that the thermosetting adhesive be quickly heat activated and set to a secure condition so that the article will maintain a fixed position on the vertical surface within a matter of seconds.

For example, when applying molding clips to the side door or side fender portions of automobiles which ultimately receive a decorative molding trim of chrome or stainless steel, it is desirable to thermally activate the adhesive material on such molding clips in a matter of seconds and the thermosetting adhesive mixture must cool or set rapidly to a secure condition for holding the clip in position on the side of the car also in a matter of seconds.

Furthermore, by utilizing thermosetting adhesive layers on the back of such molding clip it eliminates the need of drilling holes through the car door and/or car fender and water and moisture will not enter the interior portions of the car to cause rust as has been customarily the case in prior years.

SUMMARY OF THE INVENTION

Accordingly, it is an object of this invention to provide a fast acting thermosetting adhesive which takes the form of a dry film and which can be applied to the back surface of molding clips or other fastening devices.

Another object of this invention is to provide a thermosetting adhesive tape or sheet upon which a plurality of articles to be mounted can be positioned in strip form and fed automatically, if desired, to heat applying means for quickly applying such clips during mass production assembly line runs.

A still further object of this invention is to provide an improved fastener for receiving articles to be mounted and wherein the fastener itself is secured to a surface by thermosetting adhesive.

Briefly, the thermosetting adhesive tape of this invention consists of a support layer preferably of polyurethane upon which is coated a dried thermosetting adhesive mixture of nitrile phenolic. The mixture includes carboxy-modified NBR polymer, thermosetting phenolic resins, coumarone-indene resin, and relatively small amounts of sterically hindered phenol of the type octadecyl 3-(3',5'-di-tert-butyl-4'-hydroxyphenyl) propionate. The thermosetting adhesive mixture is primarily a nitrile phenolic which is made into a wet solution by dissolving the above materials into a solvent of tetrahydrofuran, or sometimes called tetramethylene oxide. This solvent is commonly referred to as THF. Also included in the solvent mixture are lesser amounts of methyl ethyl ketone and methyl isobutyl ketone. The tetrahydrofuran is of sufficient quantities to insure proper bonding of the thermosetting layer to the polyurethane support sheet or surface.

The polyurethane support sheet may have one or both sides thereof coated with the heat activatable nitrile phenolic formulation. The polyurethane layer or sheet has an elongation factor of about 500% to 700% and may be of a thickness of about five to fifteen mils when both sides are coated with the nitrile phenolic and a thickness of about twenty mils when only one side is coated. The dried layer of heat activatable nitrile phenolic, which forms the thermosetting adhesive, is in a thickness of about two to four mils when dry, this varying depending on its particular use. When only one surface of the polyurethane sheet is coated, the other surface can be bonded to its associated article by solvents which soften the polyurethane in a usual manner for bonding purposes.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is an enlarged elevational sectional view of a thermosetting adhesive tape with a layer of polyurethane as a center support;

FIG. 2 is a thermosetting adhesive similar to that shown in FIG. 1 but which has silicon rubber as a center support layer;

FIG. 3 is a thermosetting plastic sheet similar to that of FIG. 1 but which has only one surface thereof receiving a coating of thermosetting material while the other uncoated surface of the polyurethane is to be secured to a fastener by solvents;

FIG. 4 is a side elevational view of an improved molding clip which is designed to use the thermosetting adhesive of this invention;

FIG. 5 is a plan view of the molding clip of FIG. 4;

FIG. 6 is an end view of the molding clip of FIG. 4;

FIG. 7 is a side view of an automobile using a plurality of the molding clips shown in FIGS. 4, 5 and 6;

FIG. 8 is a sectional view taken along line 8—8 of FIG. 7 showing the method of connecting the molding strip to the clip;

FIG. 13 illustrates a series of fasteners secured to a continuous tape of thermosetting adhesive tape and wherein the fasteners are severed from one another just prior to or during application thereof to the surface receiving the same.

DETAILED DESCRIPTION OF THE ILLUSTRATED EMBODIMENTS

Figure 9:
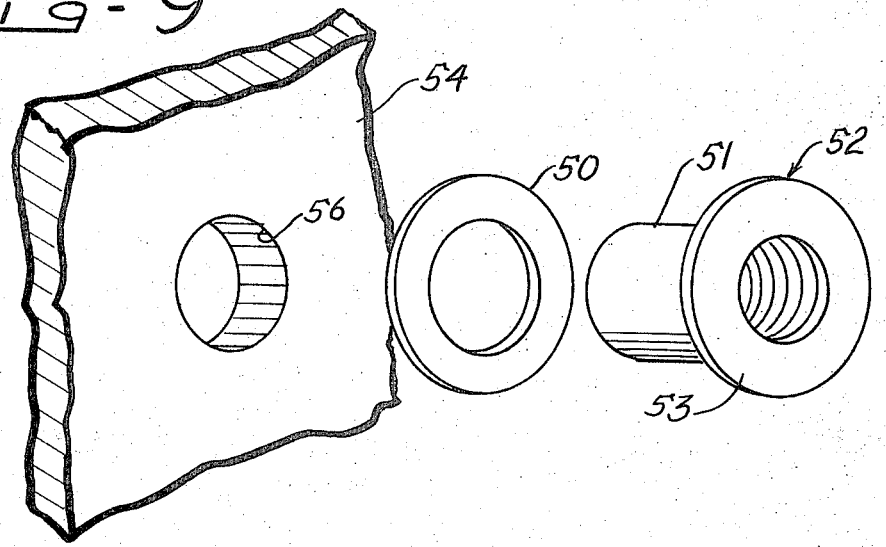
FIG. 9 is an exploded perspective view of another use for securing fasteners to bulkheads or the like utilizing thermosetting adhesive tape of this invention.

The thermosetting adhesive of this invention takes the form of a tape which can be secured to a molding clip or other fastening members. It is basically a tape having a dry or nontacky surface on either side which may be activated by an outside heat energy source. The heat energy source may be an induction heating unit when metal surfaces are involved. In one embodiment of this invention a three-layer adhesive tape comprises a nitrile phenolic thermoset layer which is deposited on either side of a soft polyurethane sheet or layer and dried thereon. The polyurethane sheet may be of a thickness of about five to fifteen mils while the nitrile phenolic thermoset deposited thereon will be in the order of two to four mils this being after drying of the previously wet thermoset adhesive. The nitrile phenolic bonds well to both thermoplastic and thermoset paints as well as to nylon clips or the like. Therefore, when applying the molding clips to automobiles which have the surfaces already painted with such thermoplastic or thermoset paints the application of sufficient heat to secure the thermosetting adhesive must not damage the already painted surface.

The polyurethane support sheet has been found to have a great affinity for the nitrile phenolic so the layers will adhere well to other articles as well as to the polyurethane sheet thus forming a secure bond therebetween. Preferably, molding clips of the type disclosed herein include a recess formed in the back surface thereof so that the clip cannot be pressed fully against the surface to which it is mounted. This recess then allows a sufficient thickness of melted thermosetting adhesive to remain between the clip and the mounting surface. By thus providing a sufficient thickness of thermosetting adhesive the sheer strength of such clips is greatly improved.

Another embodiment of a thermosetting adhesive tape disclosed herein includes only two layers, one being the support sheet of polyurethane or silicon rubber and the other being the nitrile phenolic coating which is applied thereto and subsequently dried. In this instance, the polyurethane sheet may be in the order of about twenty mils thick and the uncoated surface of the polyurethane is then secured to a clip or other fastener device by a solvent bond.

Referring now to FIG. 1 a thermosetting adhesive tape is constructed in accordance with this invention and is designated generally by reference numeral 10. The tape 10 is formed by a flexible support sheet or layer 12 of polyurethane, preferably being a polyether-based thermoplastic polyurethane. One source of such polyurethane sheet material is from B. F. Goodrich Chemical Company, Division of B. F. Goodrich Company, 3135 Euclid Avenue, Cleveland, Ohio and identified under their part No. Tuftane TF110.

Upon both surfaces of the polyurethane sheet 12 is applied a wet slurry of thermosetting adhesive in a solvent mixture which is ultimately dried to form non-sticky layers 14 and 16 of nitrile phenolic. The nitrile phenolic layers 14 and 16 are activated by the application of heat, this being in the order of 200° F. to 400° F. The formulation used to form the layers 14 and 16 is extremely fast acting and can be thermally energized and set in a matter of about three to five seconds.

The nitrile phenolic layers 14 and 16 are formed by a mixture of carboxy-modified NBR polymer, thermosetting phenolic resin, coumarone-indene resin, and a slight amount of sterically hindered phenol of the type octadecyl 3 - (3',5' - di-tert-butyl - 4' - hydroxyphenyl) propionate. Throughout the specification and claims the term NBR polymer is a butadiene copolymer with acrylonitrile. The carboxy-modified NBR polymer may be in a quantity of about 20 to 140 parts by weight while the thermosetting phenolic resin is in a quantity of about 100 to 200 parts by weight. The coumarone-indene resin is in a quantity of about one to ten parts by weight while the sterically hindered phenol is in a quantity of about .1 to 10 parts by weight.

While various formulation variations can be made the preferred formulation of the above mixture is carboxy-modified NBR polymer of 80 parts by weight, thermosetting phenolic resin of 153 parts by weight, coumarone-indene resin of five parts by weight, and said sterically hindered phenol of one part by weight. Traces of coloring may be added to the slurry to better indicate its application onto a somewhat opaque polyurethane sheet.

The thermosetting adhesive tape may be modified by utilizing a silicon or rubber support sheet 18, as shown in FIG. 2. Silicon rubber support sheet will provide a more flexible thermosetting adhesive tape element for use in bonding together complicated configurations. Here the silicon rubber sheet has the thermosetting nitrile phenolic layers 20 and 22 formed on each side thereof in substantially the same manner as shown in FIG. 1. In either case, i.e. using polyurethane support sheet 12 or silicon rubber support sheet 18, only one surface thereof may be coated with a nitrile phenolic thermosetting adhesive, this being illustrated in FIG. 3. Here the support layer 26, which is illustrated as polyurethane, is provided with a single layer 24 of nitrile phenolic of the above formulation.

The thermosetting adhesive tape disclosed herein has many practical uses, one being in connection with a molding clip 30 illustrated in FIGS. 4, 5 and 6. Here the molding clip 30 has a main body portion 31 behind which is secured a length of the thermosetting adhesive tape 10. The length of thermosetting adhesive tape 10 is positioned within a recess 32 so that upon applying the molding clip securely to a painted surface of an automobile and pressing the clip against the surface, a sufficient thickness of the thermosetting adhesive remains between the molding clip 30 and the painted surface.

In the illustrated embodiment herein the molding clip 30 includes transversely extending tab segments 35 which prevent the metal molding strip from coming into actual contact with the painted surface adjacent the clip. The clip 30 includes a pair of parallel resilient finger sections 33 and 34 formed at both ends thereof and are flexed inwardly toward one another upon applying a molding strip thereto.

To insure proper gripping of the molding strip to the clip 30 the outer surfaces of the resilient finger portions 33 and 34 are angled, as seen in FIG. 6, with the initial surface angle 36 being about 45° and indicated by the letter A. Upon further application of the edge of the molding strip over the angled surface 36, the edge of the molding strip comes in contact with a second angled surface 37, this being indicated by angle B and is in the order of about 17½°. The main body of the clip, inwardly of the flexible fingers 33 and 34, has tapered side walls of an angle C, this being in the order of about 10°.

The molding clip 30 is particularly useful for applying decorative molding to the side of automobiles as shown in FIG. 7. Here a plurality of molding clips 30 are secured in in-line fashion along the side of an automobile, with portions of the molding clips on the front and rear fenders and other portions on the door. The molding clips are applied by heating means so as to quickly raise the temperature of the thermosetting adhesive sufficient to activate the same, this being in the order of about 200° F. to 400° F. for a three to five second time duration. Preferably, when utilizing the molding clip 30 for application to thermoplastic or thermoset paints, a heat of approximately 350° F. is applied for a period of about three seconds and no thermo deformation of the paint to which the clip is applied will occur. Also, the formulation as set forth hereinabove is particularly useful in the automotive industry for applying molding clips as mentioned above since this thermosetting adhesive is substantially impervious to water and oil.

FIG. 8 is a sectional view taken along line 8—8 of FIG. 7 and more clearly shows how a molding strip 39 is secured to the side of an automobile 40. The side door 41 is shown in section and the molding clip 30 is secured thereto with a layer of thermosetting adhesive tape 10 remaining between the clip 30 and the door surface. The molding 39 has inwardly turned edge portions 42 which are forced over the inclined surfaces 36 and ultimately come to rest against the tabs 35 and grip the inclined surface 37. The sharpness of the inwardly turned edges 42 is sufficient to dig into the clip fingers and securely hold the molding to the side of the automobile.

Referring now to FIG. 13 a plurality of clips 30, or other fastening devices, can be secured to a continuous sheet or strip of tape 44, which forms the thermosetting adhesive tape for the clip and a packaging carrier. Each of the molding clips 30 can be severed from the strip and applied as desired. Furthermore, clips secured to continuous lengths of thermosetting adhesive tape as shown in FIG. 13 lend themselves to automatic feeding to applying apparatus for mass production assembly lines.

An alternate form of fastening arrangement utilizing thermosetting adhesive tape of this invention is shown in FIG. 9. Here the tape is formed into a circular ring 50 to secure a threaded grommet 52 to a honeycomb constructed bulkhead so that other components can be threadedly fastened thereto. The circular ring 50 is preferably of the same construction as the thermosetting adhesive tape 10 of FIG. 1 and is slipped over a threaded cylinder portion 51 of the grommet 52. The grommet 52 includes a radially outwardly extending shoulder 53 against which the thermosetting adhesive tape rests. The threaded grommet 52 together with the thermosetting adhesive washer 50 are mounted to a bulkhead 54 by inserting the cylindrical portion 51 into an aperture 56. The honeycomb bulkhead 54 is a common construction for aircraft interior walls which are to be of light materials but which also have the need for bolting other devices thereto.

Figure 10:
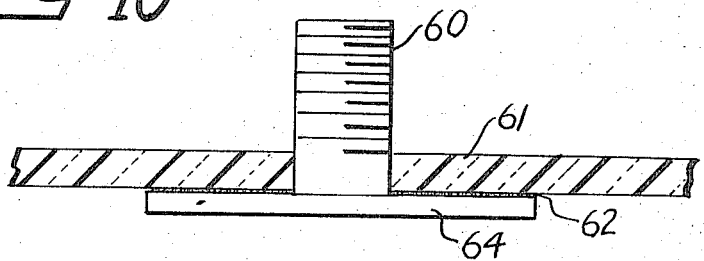
FIG. 10 is still another showing of a fastener secured to a bulkhead utilizing the thermosetting adhesive tape of this invention.

FIG. 10 illustrates a fastener 60 extending through a wall portion 61 and secured thereto by a quantity of thermosetting adhesive 62 positioned between the wall portion 61 and a head or flange portion 64. For example, the wall portion 61 may be a segment of a fiberglass or plastic plenum chamber, and the threaded fastener 60 will receive a discrete component to be mounted on the wall and then held in place by a nut.

Figure 12:
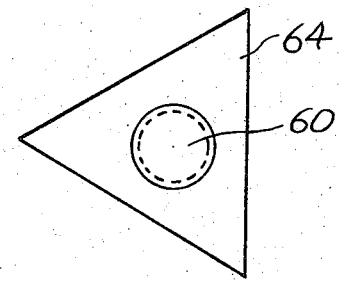
FIG. 12 illustrates the configuration of the support body from which the stud of FIG. 10 extends through the support surface.

The flange portion 64 may be triangular in configuration, as shown in FIG. 12, and will receive an apertured triangularly shaped pad of thermosetting adhesive tape which has the aperture therein positioned over the threaded portion 60.

Figure 11:
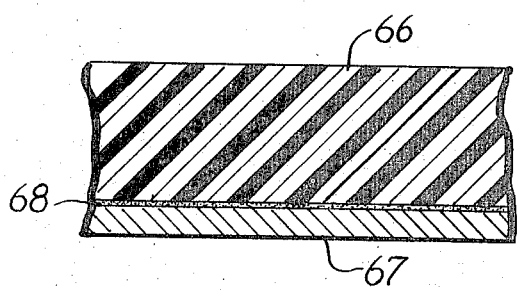
FIG. 11 illustrates a rubber bumper secured to a steel support by means of the thermosetting adhesive tape of this invention positioned therebetween.

The thermosetting adhesive tape as formulated in accordance with this invention is also usable for bonding rubber to steel as shown in FIG. 11. Here a rubber bumper or cushion pad 66 is secured to a steel support plate 67 by a layer of thermosetting adhesive 68 therebetween. The thermosetting adhesive is activated by application of heat to the steel support plate 67 either by induction heating or by any other suitable means.

While induction heating is one convenient means of activating the thermosetting adhesive tape set forth herein it is not to be construed as a limiting feature.

The carboxy-modified NBR polymer preferably is a crumb elastomer dusted with mineral and identified as Hycar 1472, which can be supplied by B. F. Goodrich Chemical Company, Division of B. F. Goodrich Company, 3135 Euclid Avenue, Cleveland, Ohio. The thermosetting phenolic resin is a finely pulverized resin identified as Durez 12687 being a cashew modified two step phenolic resin, and can be supplied by The C. P. Hall Company of Illinois, 7300 South Central Avenue, Chicago, Ill. The coumarone-indene resin is a resin mixture of polymerized coumarone and polymerized indene and identified as Cumar E-10 and is supplied by the Neville Chemical Company, Neville Island, Pittsburgh, Pa. The sterically hindered phenol octadecyl 3-(3',5'-di-tert-butyl-4'-hydroxyphenyl) propionate is simply identified as Irganox 1076 and supplied by the Geigy Industrial Chemicals, a Division of the Geigy Chemical Corporation, Ardsley, N.Y.

The carboxy-modified NBR polymer, Hycar 1472 and 1072 being 2.5% carboxylated butadiene acrylonitrile copolymer. The former being a crumb and the latter being a slab. Hycar 1001 x 225 and Hycar 1432 are similar to Hycar 1472 and 1072 but are not carboxylated.

Although several embodiments of the thermosetting adhesive tape have been disclosed and several different uses shown, it will be understood that variations and modifications of this invention can be effected without departing from the spirit and scope of the claims.

The invention is claimed as follows:

1. A heat activatable fastener for mounting to a surface and for holding other articles thereto, comprising in combination, a body portion, an adhesive receiving portion formed on said body portion to receive a laminate adhesive including a dry layer of thermosetting adhesive which is activatable upon application of heat thereto, fastening means extending from said body portion and arranged to receive articles for mounting, said thermosetting adhesive being formed of a mixture of carboxy-modified NBR polymer in the range of about 20 to 140 parts by weight, thermosetting phenolic resin in the range of about 100 to 200 parts by weight, sterically hindered phenol of the type octadecyl 3-(3',5'-di-tert-butyl-4'-hydroxyphenyl) propionate which is in the range of about .1 to 10 parts by weight and a coumarone-indene resin in the range of about 1 to 10 parts by weight, the thermosetting adhesive being dissolved in a solvent of tetrahydrofuran, the laminate adhesive including a layer of polyurethane positioned between the thermosetting adhesive and the adhesive receiving portion and thereby providing a support sheet of high elongation factor which has a great affinity for adhesion to the thermosetting adhesive layer thereby providing a heat activatable means for securing the body to the mounting surface which is relatively insensitive to the extremes of environmental conditions.

2. The heat activatable fastener of Claim 1 wherein said carboxy-modified NBR polymer is a crumb elastomer dusted with mineral.

3. The heat activatable fastener of Claim 1 wherein said carboxy-modified NBR polymer is about 80 parts by weight, said thermosetting phenolic resin is about 153 parts by weight, and said coumarone-indene resin is about 5 parts by weight.

4. The heat activatable fastener of Claim 1 wherein said octadecyl 3-(3',5'-di-tert-butyl - 4' - hydroxyphenyl) propionate is about 1 part by weight.

5. The heat activatable fastener of Claim 1 wherein said fastening means is formed by spaced apart flexible fingers extending from each end of said adhesive receiving portion on the body and said body is rectangular in configuration, whereby C-shaped channel members are fastened to said body by snapping over said resilent fingers.

6. The heat activatable fastener of Claim 1 wherein said fastening means includes a threaded shaft extending from said body for receiving a threaded member for fastening thereto.

7. The heat activatable fastener of Claim 1 further including a second layer of thermosetting adhesive on the opposite surface of said polyurethane, the second layer of thermosetting adhesive secured directly to the adhesive receiving portion and the first layer of thermosetting adhesive adapted to adhere to the mounting surface upon application of heat to the adhesive.

References Cited

UNITED STATES PATENTS

| | | | |
|---|---|---|---|
| 3,703,747 | 4/1972 | Hamman | 52—717 |
| 3,345,206 | 10/1967 | Korpman | 260—845 |
| 3,246,049 | 4/1966 | Webber | 260—829 |
| 3,606,431 | 9/1971 | Kunevicius | 293—62 |
| 2,581,926 | 1/1952 | Groten et al. | 156—331 |
| 3,288,512 | 11/1966 | Zientara | 52—717 |
| 3,439,950 | 4/1969 | Kunevicius | 52—717 |

GEORGE F. LESMES, Primary Examiner

P. J. THIBODEAU, Assistant Examiner

U.S. Cl. X.R.

52—717; 156—331, 335; 161—190, 208, 257; 260—829; 293—62